United States Patent [19]
Koch

[11] Patent Number: 5,528,449
[45] Date of Patent: Jun. 18, 1996

[54] ARRANGEMENT FOR SEPARATING A CONTROL DEVICE FROM AN AC MAINS SUPPLY

[76] Inventor: Dietmar Koch, Zur Merhardt 9, D-51645 Gummersbach, Germany

[21] Appl. No.: 244,425

[22] PCT Filed: Nov. 25, 1992

[86] PCT No.: PCT/DE92/00993

§ 371 Date: May 26, 1994

§ 102(e) Date: May 26, 1994

[87] PCT Pub. No.: WO93/11593

PCT Pub. Date: Jun. 10, 1993

[30] Foreign Application Priority Data

Dec. 2, 1991 [DE] Germany .................... 41 39 647.2

[51] Int. Cl.⁶ .................................................. H01H 47/22
[52] U.S. Cl. ........................... 361/160; 307/116; 307/140
[58] Field of Search ........................... 361/160, 170, 361/171; 307/17, 38–40, 116, 134, 135, 139, 140, 150, 154, 80, 85, 86

[56] References Cited

U.S. PATENT DOCUMENTS

| | | | |
|---|---|---|---|
| 3,344,313 | 4/1965 | Kraus, Sr. ............................ | 361/45 |
| 3,886,376 | 5/1975 | Asija ................................... | 307/116 |
| 4,617,501 | 10/1986 | Smith .................................. | 361/91 X |
| 4,730,089 | 3/1988 | Pepper ............................... | 307/140 |
| 4,994,726 | 2/1991 | Tamura et al. ..................... | 320/2 |

FOREIGN PATENT DOCUMENTS 2624316  12/1977  Germany .

*Primary Examiner*—Fritz M. Fleming
*Attorney, Agent, or Firm*—Brooks & Kushman

[57] ABSTRACT

The invention relates to an arrangement for isolating control devices from the mains in cases where the internal operating voltage is supplied by means of a mains-bound voltage source.

Control devices of this kind, which are used in many fields of engineering, including applications in living rooms and bedrooms, are always connected to mains voltage, this entailing disadvantages in terms of costs, a hazard potential and concerns as regards health.

The task of the invention, which consists in isolation from the mains during times at which no control functions are to be performed, is solved by providing a relay (12) with at least one relay-actuated switch which is in the OFF position when not excited and is located in the mains-side supply lead (11) and by providing an auxiliary power source (9, 10) which is wired in parallel with the mains-bound voltage source (7, 8) and is connected to the control input of the relay (12) via a switch (3 to 6). (FIG.)

14 Claims, 1 Drawing Sheet

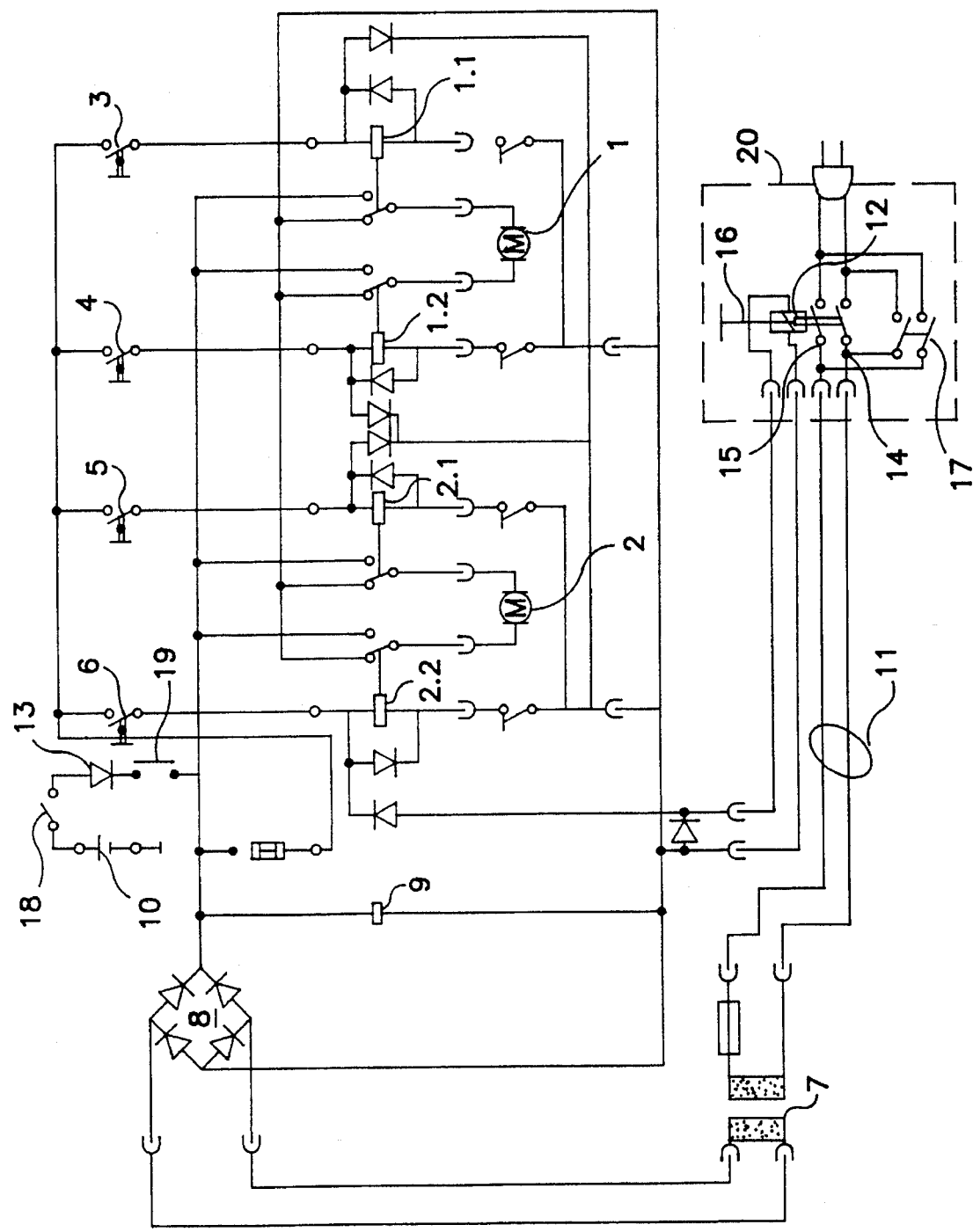

1

ARRANGEMENT FOR SEPARATING A CONTROL DEVICE FROM AN AC MAINS SUPPLY

TECHNICAL FIELD

The invention relates to an arrangement for isolating control devices from the mains in cases where the internal operating voltage is supplied by means of a mains-bound voltage source.

BACKGROUND ART

Control devices of this kind are used in many fields of engineering, including applications in living rooms and bedrooms.

For instance, it is common for modern seating or beds to be fitted with drive motors for adjustment. Low-voltage DC motors are used for this purpose. Miniature transformers are installed to reduce the mains voltage to the necessary operating voltage. These transformers are usually connected to the mains voltage, and the no-load current of the transformer flows at all times, even when no adjustment is being made, this entailing disadvantages in terms of costs and the environment.

As these transformers are usually also located in the direct vicinity of combustible material and in the immediate sphere of action of persons, there is additionally constant potential danger potential as a result of the risk of fire or electric shock.

Furthermore, the transformer generates a magnetic field, the negative effects of which on the human body, at least in the case of long-term exposure, can no longer be ruled out according to the latest scientific evidence. Moreover, frequently unavoidable humming noises disturb the persons in the room.

DISCLOSURE OF THE INVENTION

The task of the invention is now to create an arrangement for isolating control devices from the mains, by means of which isolation from the mains takes place during times at which no control functions are to be performed and which implements connection to the mains upon receipt of control commands, thus avoiding the disadvantages of continuous mains operation.

In accordance with the invention, the task is solved by the arrangement for isolating control devices from the mains displaying a relay with at least one relay-actuated switch which is in the OFF position when not excited, is located in the mains-side supply lead and possesses an auxiliary power source which is wired in parallel with the mains-bound voltage source and is connected to the control input of the relay via a switch.

The mains power is thus fundamentally isolated from the mains-bound voltage source, meaning that the control device cannot be supplied with an operating voltage via this source, although this is also not necessary as long as no control operations, or at least none requiring a great amount of power, are to be triggered.

Only when power is to be supplied via the mains is the relay excited via the auxiliary power source, thus switching the relay-actuated switch or switches to the ON state and connecting the voltage source on the mains side. The control device is supplied with an operating voltage via the mains-bound voltage source as a result. Even high-power control operations can subsequently also be performed. The auxiliary power source remaining in the parallel circuit has no effect on the function.

In one favourable configuration of the invention, a switch which triggers the functions of the circuit arrangement is connected to the control input of the relay.

The result of this is that, on the one hand, the arrangement pursuant to the invention can be installed with only little additional circuitry and, on the other hand, disconnection or reconnection of the mains always takes place automatically when the switch is operated, meaning that additional manual operations can be dispensed with.

As the control operations to be performed usually have a relatively short time limit, another configuration of the invention according to the invention is characterised in that a push-button 16 is connected to the control input of the relay.

In favourable configurations of the invention, the auxiliary power supply takes the form of a battery or a capacitor, which preferably has a low leakage current.

In one favourable configuration of the invention, the auxiliary power source consists of a capacitor with a battery connected in parallel.

The special advantage of this configuration is that the battery is only required when switching on for the first time, in order to switch the relay once. All switching operations subsequently performed by the switch draw their energy from the capacitor, meaning that the battery is no longer loaded and thus has a service life of several years. Commercially available capacitors have such low leakage currents that the circuit can draw its power from the capacitor for several weeks. Each new actuation recharges the capacitor and makes it ready for further weeks of switching. Only in the event that the energy stored in the capacitor is no longer sufficient is the current for the next starting operation drawn from the battery. If suitable components are selected, the result is that the battery is then not loaded if the period between two switching operations is no more than two to three weeks. As the control is usually operated daily, disconnection from the mains can be handled solely via the capacitor, thus achieving optimum functional reliability in a simple manner.

Instead of the battery, it is also possible to use a bridging switch 17 connected in parallel with the relay contacts. Pressing this push-button causes charging of the capacitor, with the advantages described above. The capacitor is also charged if the relay contacts are operated by hand.

As it is only necessary in this context to compensate for the leakage losses on the capacitor, it is also favourable to locate an intermittently closing switch 18 in the battery line.

Modifications of this kind have the advantage that the capacitor, with its relatively low internal resistance, can be used as a voltage source, this meaning that the relay is reliably switched as a minimum and it may also be possible to perform short movements of the actuator, without having to use batteries with a high capacity and/or low internal resistance for this purpose.

In one particularly favourable configuration of the invention, a relay-actuated switch 19 is located in the connecting lead of the auxiliary power source, this switch being connected to the relay and in the ON position when the relay is not excited.

This ensures that the auxiliary power source is immediately isolated from the control device when the voltage source is connected to the mains, as the relay is then excited and this relay-actuated switch shifts to its OFF position. This is an advantage when using batteries, in particular, as it effectively prevents a current—which could be relatively high during operation of the actuators—from flowing from the auxiliary power source to the rest of the control device. Thus, this embodiment serves to increase the battery service life.

BRIEF DESCRIPTION OF THE DRAWING

The invention is explained in more detail below on the basis of a practical example. The associated drawing shows a circuit diagram of the arrangement according to the invention in an actuator for beds.

DESCRIPTION OF THE PREFERRED EMBODIMENTS

In this case, actuator 1 is provided for altering the position of the foot end of a slatted bed base, serving to support a mattress, and actuator 2 for altering the position of the head end.

Actuators 1 and 2 are designed as DC motors.

Actuator 1 is controlled via relays 1.1 and 1.2, and actuator 2 via relays 2.1 and 2.2, each of which reverse the polarity of the motor voltage, thus allowing the direction of adjustment to be changed.

One side of each of the relays 1.1, 1.2, 2.1 and 2.2 is connected to ground potential and the other side, via associated push-buttons 3 to 6, to operating potential, the latter being provided via a voltage source comprising transformer 7 and bridge-connected rectifier 8.

An electrolytic capacitor, 9, connected between operating voltage potential and ground, is provided to smooth the pulsating operating voltage.

Connected in parallel with the voltage source is a battery 10, which is thus connected in parallel with electrolytic capacitor 9 and constitutes an auxiliary power source together with the latter.

A relay 12 with two relay-actuated switches 14 is integrated in mains lead 11 to transformer 7, this providing bipolar isolation of transformer 7 from the mains when relay 12 is not excited. On the control input 15, relay 12 has a connection both to ground and to each switched connection of push-buttons 3 to 6.

As can be seen from the circuit arrangement, the voltage source, comprising transformer 7 and bridge-type rectifier 8, is isolated from the mains when in idle state. If actuator 1 or 2 is required to perform an adjustment operation, a user presses one of push-buttons 3 to 6. In each case, this applies the auxiliary voltage to relay 12 via the auxiliary power source, comprising battery 10 and electrolytic capacitor 9, thus resulting in closing of the relay-actuated switches. Transformer 7 is thus connected to the mains and the voltage source supplies the entire circuit arrangement with operating voltage. This allows actuators 1 and 2 to perform their adjustment operation.

A diode 13 is connected in series with battery 10. This diode 13 prevents a flow of current from battery 10 when the operating voltage is supplied via the voltage source, as the battery voltage selected is smaller than the operating voltage and diode 13 is blocked in this case.

In order to allow adjustment operations in the event of a mains power failure, the battery current flows via diode 13 into the circuit arrangement when push-buttons 3 to 6 are operated. Once adjustment has been completed, the operated push-button 3, 4, 5 or 6 is released and relay 12 drops back into its starting position, this again bringing about disconnection from the mains.

The arrangement in accordance with the invention can be located in the control device itself, in mains lead 11 or at the plug end, for instance in the form of a plug-in power supply unit 20. However, the purpose of the arrangement, of keeping the mains power as far away from the bed as possible, would make it appear sensible to provide the greatest possible distance from actuators 1 and 2.

Relay 12 is controlled via cable. In this context, the two conductors required can be installed singly, in a cable or together with the mains lead in a 4-wire cable. The latter solution appears to be the most favourable option.

| List of reference numbers | |
|---|---|
| 1 | Actuator for the foot end |
| 1.1 | relay |
| 1.2 | relay |
| 2 | Actuator for the head end |
| 3 | |
| 4 | |
| 5 | Push-button |
| 6 | |
| 7 | Transformer |
| 8 | Bridge-type rectifier |
| 9 | Electrolytic capacitor |
| 10 | Battery |
| 11 | Mains lead |
| 12 | Relay |
| 13 | Diode |

What is claimed is:

1. Arrangement for separating a control device from an AC mains supply, the control device being connected to the AC mains supply via a mains lead and being provided with a mains-bound voltage source, including a transformer and a rectifier circuit, for generating an internal operating potential, and the control device being actuated via push-buttons, the arrangement comprising:

a relay (12) having an ON position and an OFF position and being spatially separated from the control device and located in the mains lead, and the relay further having a control input (15) and at least one relay-actuated switch (14) having relay contacts which is in the OFF position when not excited and located in the mains lead (11); and an auxiliary power source (9, 10) which is wired in parallel with the mains-bound voltage source (7, 8) and connected to the control input (15) of the relay (12) upon actuation of the push-buttons (3–6).

2. The arrangement for separating a control device from an AC mains supply as recited in claim 1, wherein the auxiliary power source is a capacitor (9).

3. The arrangement for separating a control device from an AC mains supply as recited in claim 1, wherein the auxiliary power source (7, 8) is a battery (10).

4. The arrangement for separating a control device from an AC mains supply as recited in claim 1, wherein the auxiliary power source consists of a capacitor (9) and means for charging the capacitor.

5. The arrangement for separating a control device from an AC mains supply as recited in claim 4, wherein the means for charging is a manual push-button (16).

6. The arrangement for separating a control device from an AC mains supply as recited in claim 4 wherein the means for charging is a battery (10) connected in parallel to the capacitor (9).

7. The arrangement for separating a control device from an AC mains supply as recited in claim 6, further comprising an intermittently closing switch (18) coupled to the battery.

8. The arrangement for separating a control device from an AC mains supply as recited in claim 7, further comprising a second relay-actuated switch (19) connected between the auxiliary power source and the relay (12), the second relay-actuated switch (19) being in the ON position when the relay (12) is not excited.

9. The arrangement for separating a control device from an AC mains supply as recited in claim 4 wherein the means for charging is a bridging switch (17) connected in parallel to the relay contacts of the relay (12).

10. The arrangement for separating a control device from AC mains supply as recited in claim 1, wherein the at least one relay-actuated switch of the relay switches off a bipolar of the mains lead (11).

11. The arrangement for separating a control device from an AC mains supply as recited in claim 1, wherein the relay is located in a mains plug adapted as a plug-in power supply unit.

12. The arrangement for separating a control device from an AC mains supply as recited in claim 1 further comprising means connected to the control input (15) of the relay (12) for activating the control device.

13. The arrangement for separating a control device from an AC mains supply as recited in claim 12 wherein the means for activating is a switch.

14. The arrangement for separating a control device from an AC mains supply as recited in claim 12 wherein the means for activating is a push-button (16).

* * * * *